United States Patent
Witteveen

(10) Patent No.: US 7,187,103 B2
(45) Date of Patent: Mar. 6, 2007

(54) PIEZOELECTRIC DRIVE

(75) Inventor: Bonny Witteveen, Venlo (NL)

(73) Assignee: Miniswys SA, Bienne (CH)

( * ) Notice: Subject to any disclaimer, the term of this patent is extended or adjusted under 35 U.S.C. 154(b) by 108 days.

(21) Appl. No.: 10/480,006

(22) PCT Filed: Jun. 5, 2002

(86) PCT No.: PCT/CH02/00295

§ 371 (c)(1),
(2), (4) Date: Jan. 21, 2004

(87) PCT Pub. No.: WO02/099844

PCT Pub. Date: Dec. 12, 2002

(65) Prior Publication Data

US 2004/0150294 A1    Aug. 5, 2004

(30) Foreign Application Priority Data

Jun. 6, 2001  (CH) ..................... 1032/01

(51) Int. Cl.
*H01L 41/08*  (2006.01)
(52) U.S. Cl. ............... 310/323.02; 310/323.19; 310/323.03; 310/323.09; 310/323.01
(58) Field of Classification Search ............... 310/323.01–323.11, 323.19
See application file for complete search history.

(56) References Cited

U.S. PATENT DOCUMENTS 3,368,085 A    2/1968   McMaster et al.

(Continued)

FOREIGN PATENT DOCUMENTS

DE    3309239    9/1984

(Continued)

OTHER PUBLICATIONS

Piezoelectric Ceramics, N.V. Philips gloeilampenfabrieken, 1991.

(Continued)

*Primary Examiner*—Darren Schuberg
*Assistant Examiner*—J. Aguirrechea
(74) *Attorney, Agent, or Firm*—Rankin, Hill, Porter & Clark LLP

(57) ABSTRACT

A piezoelectric drive that is used to create a relative movement between a first and a second body on a plane of movement. The drive includes a flat metal sheet (1) that forms, or is secured to, the first body and that is arranged parallel to the plane of movement. The metal sheet (1) has a rest region (3) and at least one resonator area (4). An elastic spring area (5), which is parallel to the plane of the metal sheet, is disposed between the rest region (3) and the resonator area (4). A flat, rectangular piezoelement (6), which can be excited in a 3,1 mode, is coupled to a longitudinal axis (A) such that the longitudinal axis of the piezoelement (6) lies essentially on a longitudinal axis of the resonator area (4). The resonator area (4) protrudes above the piezoelement (6) in the direction of the longitudinal axes (A), and forms a tapered horn shape (7). The second body (2) is positioned relative to the sheet metal (1) such that the at least one resonator area (4), with an edge area that is disposed at the top of the horn shape, is pressed against a surface (10) of the second body (2), which is oriented in an essentially oblique manner relative to the plane of the sheet metal (1), by prestressing the spring area at a point of contact.

11 Claims, 6 Drawing Sheets

U.S. PATENT DOCUMENTS

| | | | |
|---|---|---|---|
| 4,453,103 A | 6/1984 | Vishnevsky et al. | 310/323.02 |
| 4,814,660 A | 3/1989 | Yamada et al. | 310/328 |
| 4,831,306 A | 5/1989 | Staufenberg et al. | 310/328 |
| 4,884,002 A | 11/1989 | Eusemann | 310/323.02 |
| 4,959,580 A | 9/1990 | Vishnevsky et al. | 310/323.02 |
| 5,073,739 A | 12/1991 | Iijima et al. | |
| 5,087,851 A | 2/1992 | Nakazawa et al. | 310/323.16 |
| 5,134,334 A | 7/1992 | Onishi et al. | 310/323.16 |
| 5,146,129 A | 9/1992 | Tamura et al. | 310/323.16 |
| 5,153,478 A | 10/1992 | Zingg et al. | |
| 5,162,692 A | 11/1992 | Fujimura | 310/323.15 |
| 5,191,688 A | 3/1993 | Takizawa et al. | 29/25.35 |
| 5,200,665 A | 4/1993 | Iijima | 310/323.16 |
| 5,216,313 A | 6/1993 | Ohinishi et al. | 310/323.16 |
| 5,296,776 A | 3/1994 | Wind et al. | 310/323.02 |
| 5,378,948 A | 1/1995 | Richter | |
| 5,410,206 A | 4/1995 | Luecke et al. | |
| 5,453,653 A | 9/1995 | Zumeris | |
| 5,561,337 A | 10/1996 | Toda | 310/323.02 |
| 5,828,157 A | 10/1998 | Miki et al. | |
| 5,955,820 A | 9/1999 | Uchino et al. | |
| 6,064,140 A | 5/2000 | Zumeris | 310/323.02 |
| 6,188,161 B1 | 2/2001 | Yoshida et al. | 310/328 |
| 6,201,339 B1* | 3/2001 | Tani et al. | 310/328 |
| 6,242,846 B1 | 6/2001 | Ahizawa et al. | 310/323.02 |
| 6,266,296 B1 | 7/2001 | Miyazawa | 368/28 |
| 6,323,578 B1 | 11/2001 | Suzuki et al. | 310/323.02 |
| 6,768,245 B2* | 7/2004 | Mock et al. | 310/323.02 |
| 6,825,592 B2 | 11/2004 | Magnussen et al. | |
| 6,870,304 B2 | 3/2005 | Magnussen et al. | |
| 2001/0011861 A1 | 8/2001 | Richter | |
| 2002/0038987 A1 | 4/2002 | Magnussen et al. | |
| 2003/0052575 A1* | 3/2003 | Mock et al. | 310/328 |

FOREIGN PATENT DOCUMENTS

| | | |
|---|---|---|
| DE | 19937209 | 8/2000 |
| DE | 19920436 | 11/2000 |
| EP | 1075079 A1 | 2/2001 |
| JP | 61240865 | 10/1986 |
| JP | 64001481 | 5/1989 |
| JP | 6189569 | 7/1994 |
| JP | 11052075 | 2/1999 |
| SU | 1820820 | 2/1998 |
| WO | WO/9210874 | 6/1992 |
| WO | WO/9843306 | 10/1998 |
| WO | WO 01/41228 A1 | 6/2001 |
| WO | 02/37535 | 5/2002 |

OTHER PUBLICATIONS

Press cutting from "Tages Anzeiger" (Zurich), Feb. 2, 2001.
Press cutting from "Basler Zeitung", Feb. 2, 2001.
Press cutting from "Bieler Tagblatt", Jan. 26, 2001.
Friction drive steps to smaller sizes, Eureka Magazine, Jun. 10, 2001.
Miniswys Web Page; "The Miniswys-motor-revolutionary technology", Apr. 6, 2001.
Miniswys Web Page; "Miniswys Technology: Bonsai motor with high performance"; Apr. 12, 2001.
Miniswys Web Page; "More good reasons for the Miniswys technology"; Apr. 12, 2001.
Miniswys Web Page; "Good reasons for Miniswys technology"; Apr. 12, 2001.
Miniswys Exhibit Card (front); Distributed Apr. 22, 2001.
Miniswys Exhibit Card (back); Distributed Apr. 22, 2001.
C't Magazin fur Computertechnik; Issue 10; May 2001; (Heise Zeitschriften Verlag, Germany); p. 66 (and concise explanation in English).

* cited by examiner

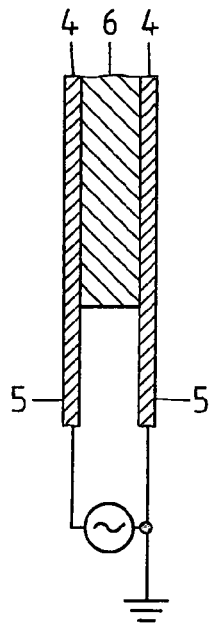
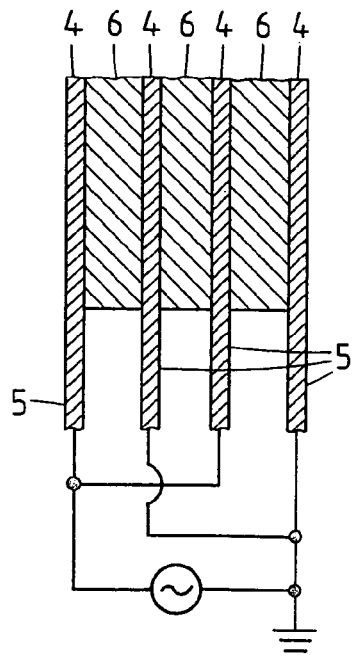
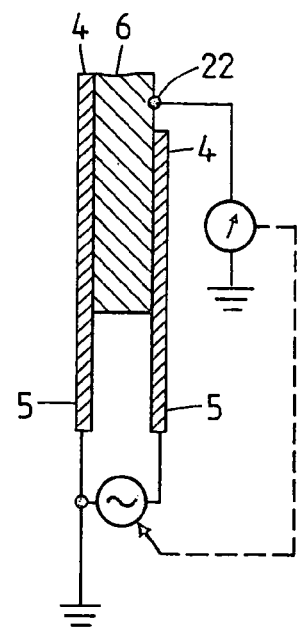
Fig. 2d     Fig. 2e     Fig. 2f
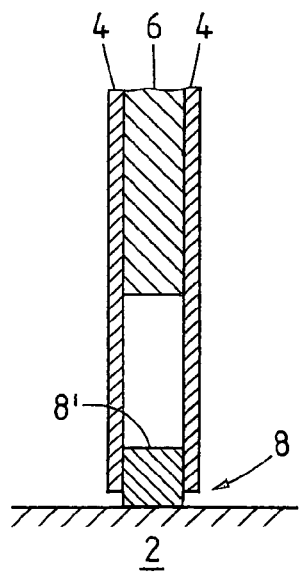
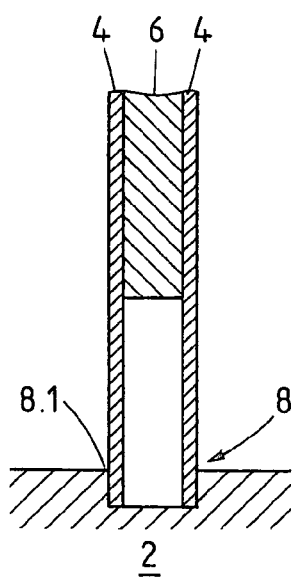
Fig. 3a     Fig. 3b

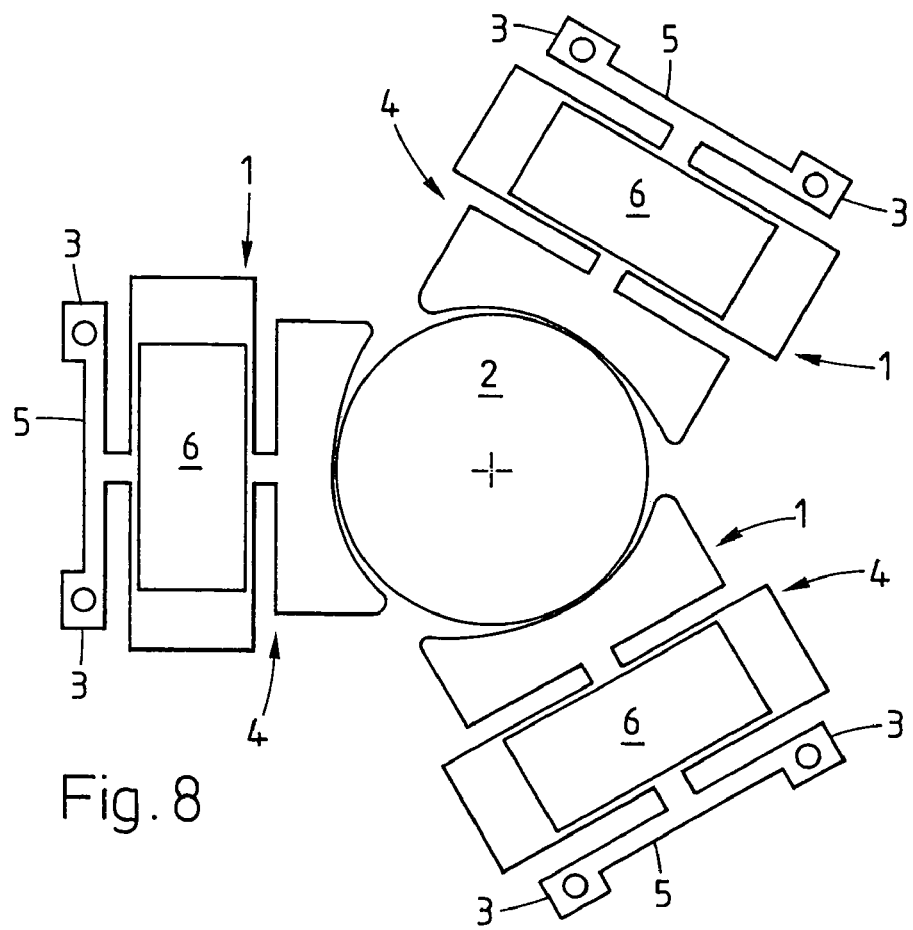
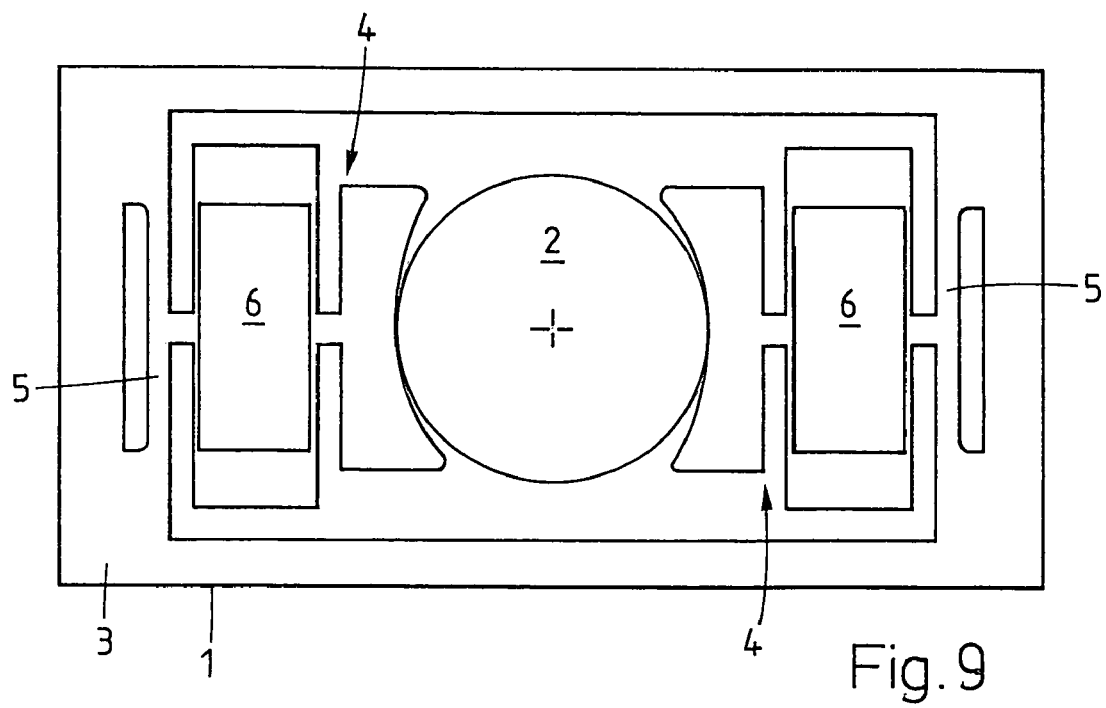

PIEZOELECTRIC DRIVE

BACKGROUND OF THE INVENTION

1. Field of the Invention

The present invention generally relates to a piezoelectric drive and, more particularly, toward a piezoelectric drive for producing a relative movement in a movement plane between a first body and a second body.

2. Description of Related Art

Piezoelectric drives, that is to say drives by way of piezoceramic materials that may be mechanically changed by an electrical voltage field, are suitable in particular for miniaturized applications, for example for motors with a motor volume of a magnitude of a few cubic centimeters or even with a volume that is smaller than one cubic centimeter. Further advantages of these drives are high torque at low speeds, simple controllability, smooth running, relatively simple construction, and their insensitivity to external magnetic fields as well as the fact that they themselves produce no magnetic fields.

Piezoelectric drives of the so-called standing-wave type comprise, as a driving element, at least one resonator, which usually consists of a piezoelement and a resonance body (horn) mechanically coupled to the piezoelement, wherein the piezoelement and the resonator body are matched to one another and the piezoelement is driven such that the resonator oscillates in a standing wave. The horn comprises a tapering free end that points away from the piezoelement and that advantageously lies on a point of the greatest oscillation amplitude. It appears that such horn tips, if they are pressed in a suitable manner against a movable body, may drive the movable body in a directed manner, wherein the force transmission is essentially based on a friction fit.

Such a drive is described in "Piezoelectric Actuators and Ultrasonic motors" of Kenji Uchino (Kluwer Academic publishers, Boston, Dordrecht, London 1997). This drive comprises a pair of disk-like piezoelements arranged coaxially over one another that are operated polarized in the opposite direction in a 3,3 mode. A horn connects essentially coaxially to the piezoelements. The horn tip is pressed against the surface of a body that is movably arranged parallel to this surface. It has been shown that the body may be driven in a directed manner with the help of the horn if the axis of the horn is not directed exactly perpendicularly towards the surface but forms a small, acute angle with the perpendiculars to the surface. If the resonator arranged in such a manner is operated at an eigenfrequency, it drives the body in that direction in which the slightly oblique horn tip points. The induced, directed movement of the driven body is explained by elliptical oscillations of the horn tip in a plane perpendicular to the surface of the body. A reversal of the movement direction is achieved by a reorientation of the resonator axis.

A similar piezomotor is described in the publication DE-3920726 (Olympus Optical). In place of the resonator of the motor described briefly above, which is symmetrical to its axis, the motor according to DE-3920726 comprises an asymmetrical horn whose tapering end does not lie on the resonator axis. The resonator is arranged with the axis directed perpendicularly to the surface of the body to be driven and with a suitable shaping of the horn tapering towards the horn tip, likewise results in a directed movement of the body created by an elliptical movement of this horn tip. At the same time there are oscillation conditions at frequencies different from one another that produce movements in opposite directions. The movement direction may thus be set via the frequency driving the piezoelements. The drive is suggested for application as a linear drive or as a rotational drive, wherein the resonator axis is aligned perpendicular to an end-face of the rotor (axially) or perpendicular to the outer surface of the rotor (radially).

The piezoelectric drive according to DE-3920726 may be realised with relatively simple means as a rotation motor with an end-face drive. In the embodiment with the end-face drive it is also possible with simple means to mutually pretension the rotor and resonator. It is indeed particularly these embodiment forms with an axially directed resonator axis that have their limits with regard to miniaturization, and one would like to go beyond these limits.

For motors that are to be very flat, in particular in the axial direction, it is therefore suggested (e.g. in EP-0505848, ETA SA) to use a centrally arranged, circular-disk-shaped piezoelement that may be driven in a planar mode. This piezoelement is coupled to a flat resonance body, which is arranged coaxially to the piezoelement and which comprises a plurality of asymmetrical horn tips extending radially towards an outer ring. Driven by the piezoelements, the horn tips again oscillate in elliptical movements by way of which the outer ring is rotatingly moved about the resonator in a directed manner. The described drive, although being able to be designed very thin in the axial direction, however has always an outer rotor. A pretension between the resonance body and the outer ring is not possible so that the drive reacts very sensitively to wear on the horn tips and the force able to be transmitted by friction remains limited.

SUMMARY OF THE INVENTION

The present invention is directed toward a piezoelectric drive that may be realised with the simplest of means, in particular in the case that its axial extension (or generally: its extension perpendicular to a plane of a movement to be produced) is to be in the range of a millimeter or less. The piezoelectric drive according to the invention is to be applicable as a linear drive or as a rotation drive, in particular as an inner rotor.

The piezoelectric drive according to the invention serves for producing a directed, relative movement between two bodies. It comprises a flat drive plate that forms one of the two bodies or is rigidly connected to this body and that extends completely flat in one plane that is parallel to the plane of the movement to be created (for a rotational movement the drive plate is aligned perpendicular to the rotation axis). The drive plate forms a rest region on which at least one resonator region is integrally formed, wherein between the rest region and the resonator region there lies a narrow spring region that is resilient in the direction of the planar extension of the drive plate and that represents an integral component of the drive plate. The drive plate advantageously comprises a plurality of resonator regions with spring regions.

A thin, rectangular piezoelement extending parallel to the drive plate and preferably able to be operated in a 3,1 mode is coupled, preferably stuck on the resonator region at least on the one side of the drive plate. The piezoelement has a length that is larger than its width, wherein its length and its width are significantly larger than its thickness. The two surfaces of the piezoelements extending transversely to the thickness are designed as contact surfaces. The longitudinal axis or the transverse axis of the piezoelement lies essentially on one axis of the resonator region. In the direction of at least one of these axes the resonator region projects beyond the piezoelement at least on one side where it forms a horn or double horn tapering asymmetrically to the axis. The piezoelement and the resonator region are matched to one another such that together they form a resonator which, by way of polarization of the piezoelement with a high-frequency alternating voltage, may be brought into a condition oscillating in a standing wave.

The two bodies to be moved relative to one another with the help of the piezoelectric drive according to the invention, of which the first is the drive plate or is rigidly connected to the rest region of the drive plate, are arranged such that the horn or double horn of the resonator region is in contact with a surface of the second body, said surface being aligned essentially transversely to the drive plate, and specifically such that the slightly pretensioned spring region presses the resonator region against the second body, and advantageously such that the longitudinal axes of the piezoelement and the resonator region are aligned essentially parallel or tangentially to the movement to be produced. The edge region of the drive plate, which is in contact with the second body (to be driven), is located directly at the horn tip or between the tips of the double horn and is advantageously aligned essentially parallel to the longitudinal axes of the piezoelement and resonator region.

Apart from the function of producing a pretension between the two bodies to be moved relative to one another, the spring region of the drive plate also has the task of decoupling the vibration produced by the driven piezoelement from the rest region of the drive plate.

It appears that the horn tip of such a flat resonator region given excitation by way of the piezoelement at a resonance frequency carries out elliptical movements in the plane of the drive plate from which there results the directed relative movement between the two bodies. It also appears that there are resonance conditions with a first movement direction and other resonance conditions with a second movement direction opposite to the first movement direction.

The elliptical movements of the horn tip may be understood as a superimposition of the longitudinal oscillation in the direction of the longitudinal axes of the piezoelement and resonator region with transversal oscillation in the direction of the width of the piezoelement, wherein the transversal oscillation propagates into the horn as bending oscillation. On the other hand a directed bending oscillation is to be expected by way of an asymmetrical design of the horn.

It appears that an arrangement in which the longitudinal oscillation runs essentially parallel to the movement direction or parallel or tangentially to the surface to be moved runs more smoothly and with a higher efficiency with respect to an essentially perpendicular arrangement, which may be explained by the weaker impacts perpendicular to the surface to be driven.

If in each case an equal piezoelement is coupled on both sides of the resonator region, and the two piezoelements are polarized oppositely to one another, then oscillations of the piezoelement in the direction of its thickness hardly effect the resonator region so that no energy is lost by friction on movement of the horn tip transverse to the movement direction.

The drive according to the invention may be used as a drive for a linear movement as well as for a rotational movement. Advantageously, a plurality of resonator regions operated in parallel with in each case one piezoelement or in each case a plurality of piezoelements is integrally formed on one drive plate. For producing a rotational movement the drive plate is arranged transversely to the rotation axis and its rest region for example has the form of a ring on which the resonator regions are integrally formed at regular distances to the inside (inner rotor) or to the outside (outer rotor). For the drive of a linear movement the rest region of the drive plate extends with a plurality of resonator regions essentially in the direction of movement.

For the electrical polarization of all piezoelements arranged on a drive plate, the drive plate may be exploited as the one of the two electrical terminals if the drive plate consists of an electrically conductive material and the piezoelements are assembled thereon with an electrically conducting adhesive. A very simple supply results if two identical drive plates are used and the piezoelements are arranged therebetween and supplied via the two drive plates. With such an embodiment form one may supply all piezoelements with only two electrical connections to the two electrically conducting drive plates, which in particular is advantageous for the smallest designs of the piezoelectric drive. In order, with an embodiment with two drive plates, to prevent oscillation of the horn tips in the direction of the thickness of the drive plate and/or to use the oscillation for the drive, it is advantageous to connect the horn tips of each resonator region of the two drive plates via an electrically insulating spacer or to provide a groove in the second body to be driven, in which the horn tips engage. The mentioned spacer may also assume the function of the friction partner with the body to be driven.

The drive plate advantageously consists of a good heat-conducting material and is large enough to conduct away heat arising on vibration in the piezoelements.

The material of the drive plate and its thickness are to be matched to the piezoelement such that the spring properties of the piezoelement and the resonator region are matched to one another as well as possible. With an equal width of piezoelement and resonator region the thickness of the drive plate is to be selected such that the product of thickness and modulus of elasticity for the piezoelement and the resonator region is equally large.

The material of the drive plate should furthermore act as little as possible in a damping manner and have a sufficient mechanical strength. Since the force of the drive according to the invention is transmitted to the body to be moved via friction, the pairing of material between the body to be moved and the drive plate is to be selected accordingly. Where appropriate, the edge region of the resonator region that is in friction contact with the body to be driven may consist of a material that is more suitable for the force transmission via friction than the rest of the drive plate, or between two drive plates a spacer of such a material may assume the friction function.

It has been shown that phosphor bronze is particularly suitable as a material for the drive plate. Phosphor bronze has a modulus of elasticity that is roughly twice as large as the modulus of elasticity of commercially available piezoelements. Thus, with a piezoelement having a thickness of 0.5 mm a resonator region of a 0.25 mm thick phosphor-bronze plate or two such resonator regions arranged on both sides of the piezoelement each with a thickness of 0.125 mm may be driven. Or, with two such piezoelements arranged on both sides one may drive a 0.5 mm thick resonator region.

The invention thus relates to a piezoelectric drive for producing a relative movement in a movement plane between a first body and a second body. This drive comprises at least one piezoelement drivable with a high-frequency alternating voltage and a resonator with a horn or double horn, said resonator being mechanically coupled to the piezoelement and excitable by the piezoelement in a standing wave. The resonator is actively connected to the first body. A region of the horn or double horn may be pressed against a surface of the second body for directed driving.

The drive comprises a drive plate, which forms the first body or is fastened on this and which is arranged essentially parallel to the movement plane. The drive plate comprises a rest region and at least one resonator region, wherein between the rest region and the resonator region there is arranged a spring region (integral part of the drive plate), which is resilient essentially parallel to the plane of the drive plate. A piezoelement is laterally coupled onto the at least one resonator region. The second body may be positioned relative to the drive plate such that the at least one resonator region with an edge region, which lies at the horn or double horn, is pressed by way of a pretension of the spring region in a contact region against the surface of the second body, said surface being aligned essentially transverse to the plane of the drive element, so that this second body may be driven essentially parallel to this surface.

BRIEF DESCRIPTION OF THE DRAWINGS

These and further features of the invention will be apparent with reference to the following description and drawings, wherein:

FIGS. 2a to 2f are sections through examples of resonators of the device according to the invention with a schematically-shown contacting of the piezoelement or piezoelements;

FIGS. 3a and 3b are sections through exemplary contact regions of resonators according to FIG. 2d with a body to be driven;

FIG. 5: outer rotor);

FIGS. 8 and 9 are two exemplary motors, which each have more than one drive according to FIG. 6; and, FIG. 10 is a schematic operating curve of a drive according to the invention.

DETAILED DESCRIPTION OF THE PREFERRED EMBODIMENTS

Figure 1:
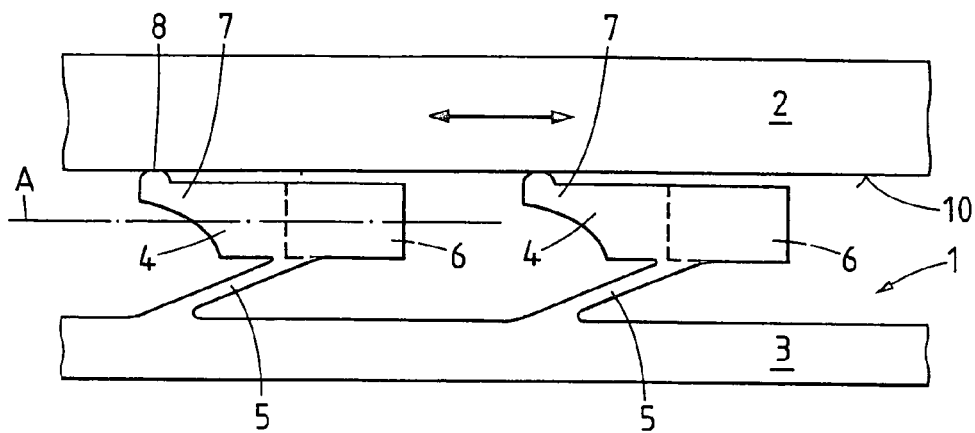
FIG. 1 schematically illustrates a linear drive with a drive plate that has a rest region and two resonator regions (viewing direction perpendicular to the drive plate)

FIG. 1 shows an exemplary embodiment form of a piezoelectric drive according to the invention, which is designed as a linear drive (viewing angle perpendicular to the movement direction and perpendicular to the drive plate). The figure shows a drive plate 1, which represents a first body or is fastened on such, and a second body 2, which by way of the drive is to be moved relative to the first body 1 in the one or the other arrow direction. The drive plate 1 comprises a rest region 3 and two resonator regions 4, wherein the resonator regions 4 connect to the rest region 3 via in each case one spring region 5.

In each case one (where appropriate two) rectangular, flat piezoelements 6 are stuck onto the resonator region, wherein the longitudinal axes of the resonator region and the piezoelement lie over one another (longitudinal axis A). The resonator region 4 has roughly the same width as the piezoelement 6 (extension transverse to the longitudinal axis A) and projects beyond the piezoelement 6 in the direction of the longitudinal axis A on one side where it forms a horn 7 tapering asymmetrically to the longitudinal axis.

The resonator regions 4 are arranged such that the longitudinal axes A are aligned essentially parallel to the movement direction (double arrow) and such that a contact edge region 8 directly at the tip of the horn 7 is pressed against a surface 10 of the second body 2, with the surface 10 being aligned essentially perpendicular to the drive plate 1. The pressing force is produced by an elastic deformation of the spring region 5 in the plane of the drive plate 1.

The spring region 5 is designed as a narrow strip whose alignment comprises a component parallel to the longitudinal axes A and a component perpendicular thereto. It opens out advantageously into the resonator region at a location at which a wave node is located for frequencies at which the drive is to be operated.

It has been shown that resonators as they are shown in FIG. 1 have drive plate thicknesses and piezothicknesses below 1 mm and planar extensions of less than one $cm^2$ for the application of usable resonant frequencies between about 20 and 1000 kHz and that movement directions opposite to one another occur at different frequencies.

FIGS. 2a to 2f show exemplary cross sections (perpendicular to the longitudinal axis) through a resonator (piezoelement 6 as well as a resonator region 4 and a part of the spring region 5 of the drive plate) of the piezoelectric drive according to the invention, as well as very schematically, a few possibilities for contacting the piezoelement 6 or the piezoelements 6.

Figures 2A, 2B, 2C:
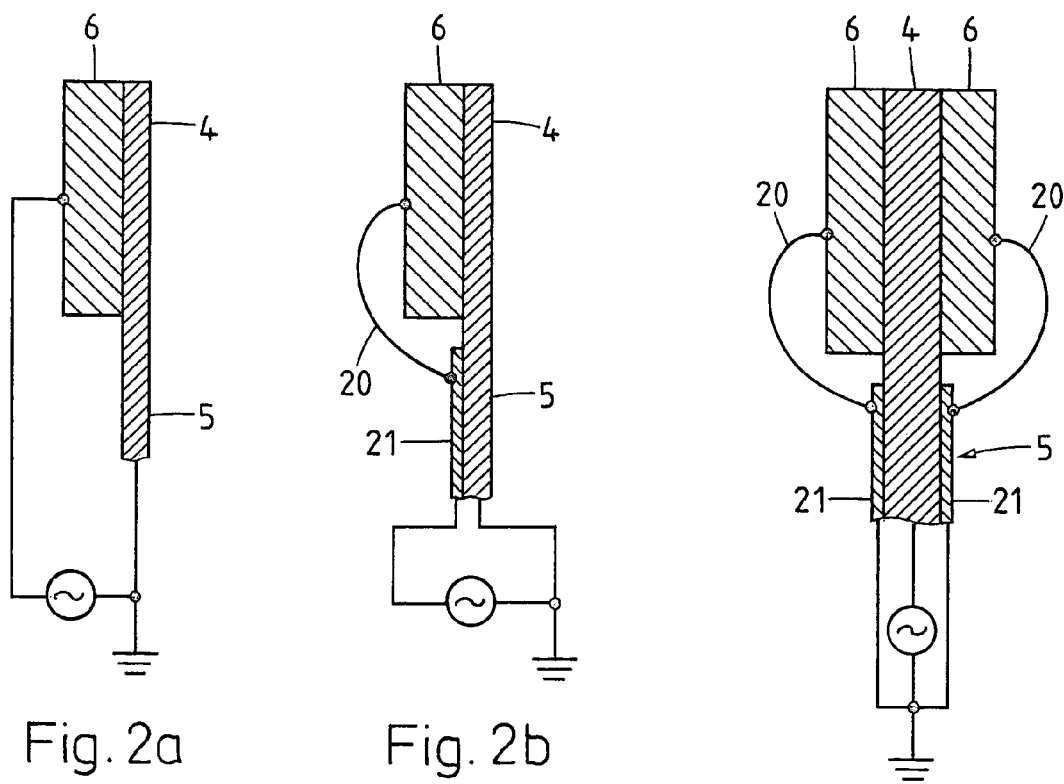

FIGS. 2a and 2b show a resonator with a piezoelement 6 coupled onto the one side of the resonator region 4. The piezoelement is contacted on the one side via the resonator region 4 to which it is stuck, for example with an electrically conducting adhesive. The spring region 5 at the same time serves as a strip conductor, which connects the piezoelement to a current source or to ground. The other side of the piezoelement 6 is contacted, for example via a bonding wire 20 or a bonding film, wherein the bonding wire 20 advantageously is connected to the contact surface of the piezoelement at a location representing a node point of the standing wave. The bonding wire 20 is connected to the current source or ground via arbitrary further conductors (FIG. 2a), e.g. as represented in FIG. 2b via a strip conductor 21 that runs on the spring region 5 and that, for example, is formed as a flexprint stuck onto the drive plate in an insulating manner.

FIG. 2c shows an embodiment form with two piezoelements that are coupled lying opposite one another on the resonator region 4. The contacting is effected, for example, on the one hand via the spring region 5 and the resonator region 4 and on the other hand via strip conductors 21 and bond wires 20 lying on both sides of the spring region 5, as is described above for FIG. 2b.

FIGS. 2d and 2e show resonators with a plurality of essentially congruently arranged resonator regions 4 of different, advantageously likewise congruent drive plates. With this in each case one piezoelement 6 is arranged between two resonator regions 4. The contacting of each piezoelement 6 is effected advantageously via the resonator region 4 in each case coupled to the piezoelement. Embodiment forms of resonators with several resonator regions 4 or drive plates, which are arranged covering one another and in which piezoelements 6 are arranged between resonator regions 4, have the advantage of a high stability perpendicular to the drive plates, which advantageously consist completely of an electrically conductive material and via which, with only in each case a single connection to the rest region of the drive plate, a plurality of piezoelements of different resonators may be contacted.

FIG. 2f shows a resonator as in FIG. 2d, which comprises two resonator regions 4 and a piezoelement 6 arranged between the resonator regions 4. The piezoelement 6 for its connection to the current source and ground is contacted via the two spring regions 5 and resonator regions 4. On the side of the piezoelement that is not applied to ground one taps off a voltage (measuring connection 22), which may serve as a measuring element of a control for the supply voltage and/or supply frequency. With this, the measuring connection is to be electrically insulated from the supply, which means the contact layer of the piezoelement 6 is to be interrupted around the measuring connection.

FIGS. 3a and 3b show sections through contact edge regions 8 of resonators according to FIG. 2d that comprise two essentially congruently arranged resonator regions 4 or drive plates and a piezoelement 6 arranged therebetween. The contact edge region 8 is that edge region of the resonator region 4 of a drive plate that is in direct or indirect contact with the body 2 to be driven.

FIG. 3a shows a contact edge region 8 in which a distance element 8 is arranged between the resonator regions 4 such that it is not the edges of the resonator regions which are directly in contact with the body 2 to be driven, but rather the distance element 8'. The distance element 8' is to be designed for a sufficient friction on the body to be driven and for an electrical insulation of the two resonator regions 4 from one another. By way of the distance element 8' oscillations of the resonator regions 4 transverse to the drive plate and the friction without use to the drive that this entails is prevented.

For resonators with more than two congruent resonator regions and piezoelements (FIG. 2e) arranged therebetween, distance elements are advantageously arranged in each case between two neighbouring resonator regions.

FIG. 3b in the same manner of representation as FIG. 3 shows a section through a contact edge region 8 of a resonator with two congruent resonator regions 4 in which the resonator regions 4 engage into a groove 8.1 of the body to be driven and are pressed against the base of the groove. The groove walls are dimensioned such that they contact the resonator regions in the rest condition. It has been shown that in such an embodiment form one may transmit more force than with embodiment forms without a groove. This is evidently due to the fact that the oscillations directed transversely to the resonator regions are directed and may be used for the drive.

Figure 4:
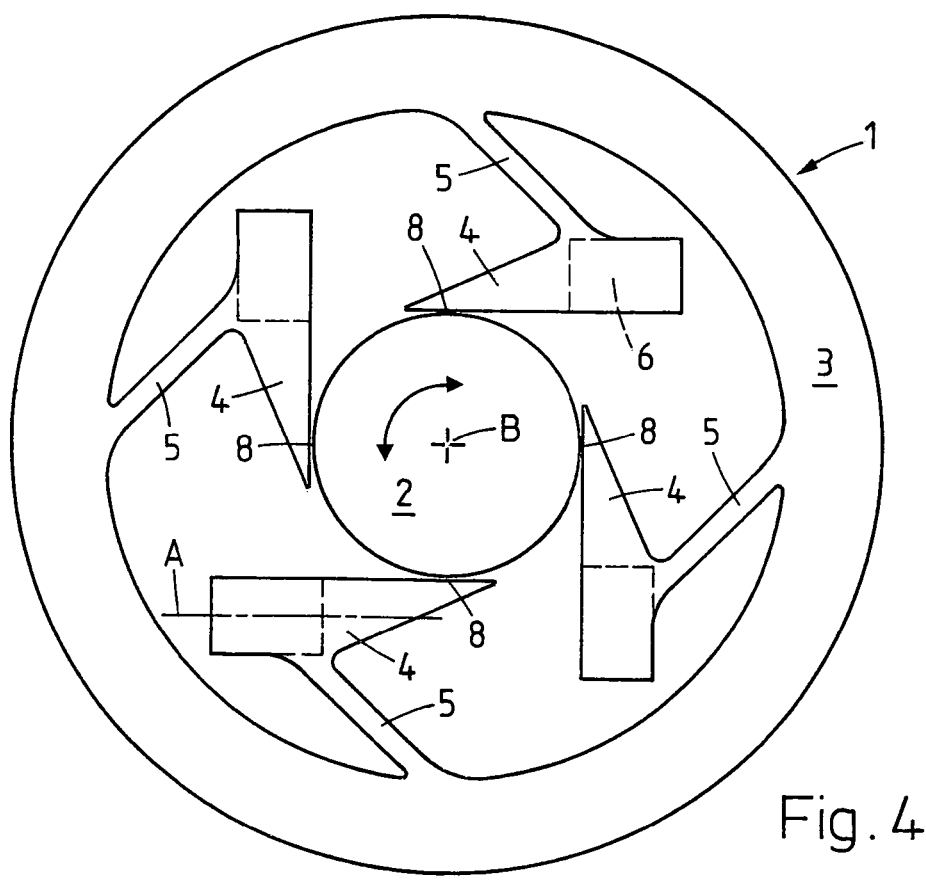
FIGS. 4 and 5 are exemplary embodiment forms of a rotation drive according to the invention (FIG. 4: inner rotor.

FIG. 4 shows a further, exemplary embodiment form of the piezoelectric drive according to the invention that is designed as a rotation drive and specifically as an inner rotor. The drive plate 1 (or where appropriate a plurality of essentially congruent drive plates), which is fastened on a stator by suitable means, comprises an annular rest region 3 and four resonator regions 4, which are directed towards the inside of the ring and which are integrally formed on the rest region 3 via spring regions 5. The drive plate 1 is arranged perpendicularly to the rotation axis B of a rotor (second body 2). The resonator regions 4 are essentially the same as those shown in FIG. 1. They comprise in each case one essentially straight-lined edge directed towards the rotor, of which a part in the region of the horn tip (contact edge region 8) is in contact with the rotor (where appropriate via a distance element). The spring regions 5 for example are likewise narrow, straight strips that are aligned in one direction with a tangential and radial component.

The rotor 2 is not only driven by the resonator regions 4 of the drive plate 1 but also held in its radial position. For certain applications, then, an additional radial pivot pin is not required.

Figure 5:
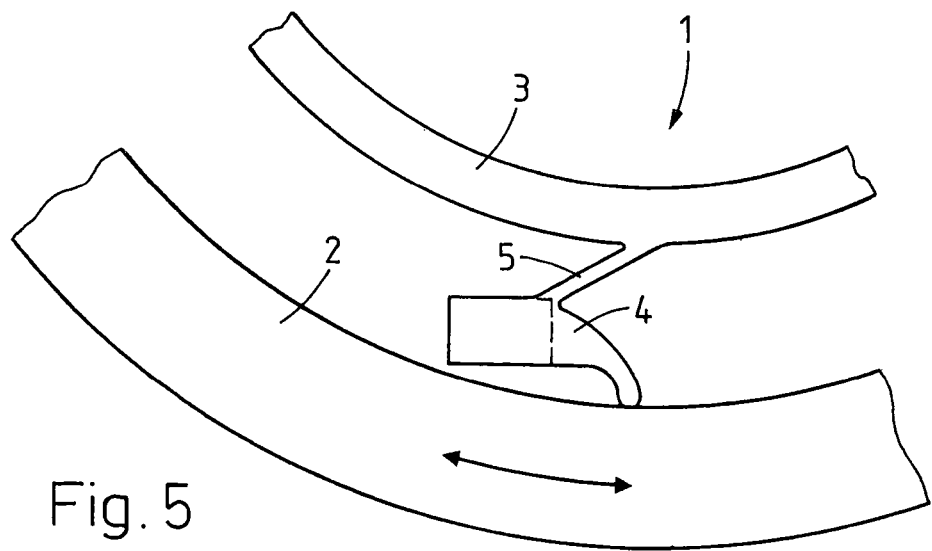

FIG. 5 shows that the piezoelectric drive according to the invention may also be applied as an outer rotor that, however, has radially larger dimensions than the inner rotor of FIG. 3. The shown drive does not differ in principle to the drives shown in the FIGS. 1 and 3. The same parts are provided with the same reference numerals.

Figure 6:
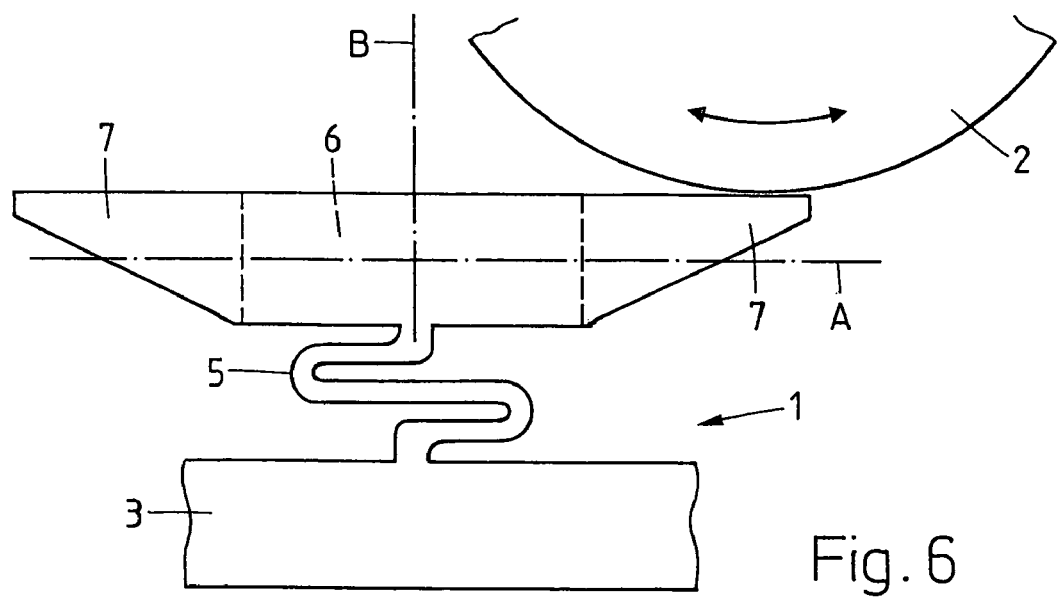
FIG. 6 illustrates a further embodiment form of a resonator region of a drive plate.

FIG. 6 shows a further embodiment form of the spring region and resonator region 4 of a drive plate 1 (or a plurality of congruently arranged drive plates). These differ from the embodiment forms of the previous figures by a shape that projects equally beyond the piezoelement 6 on both sides (two horns 7) and by the shape of the spring region 5.

The projection beyond the piezoelement 6 on both sides gives the resonator region 4 a symmetrical shape relative to the transverse axis B such that standing longitudinal waves with an uneven number of wave nodes have an exactly middle wave node. The middle opening of the spring region 5 into the resonator region 4 is directed to this wave node.

The spring region 5, which is again designed as a narrow strip of the drive plate, has two curves and between these a region that is aligned essentially parallel to the longitudinal axis A.

Figure 7:
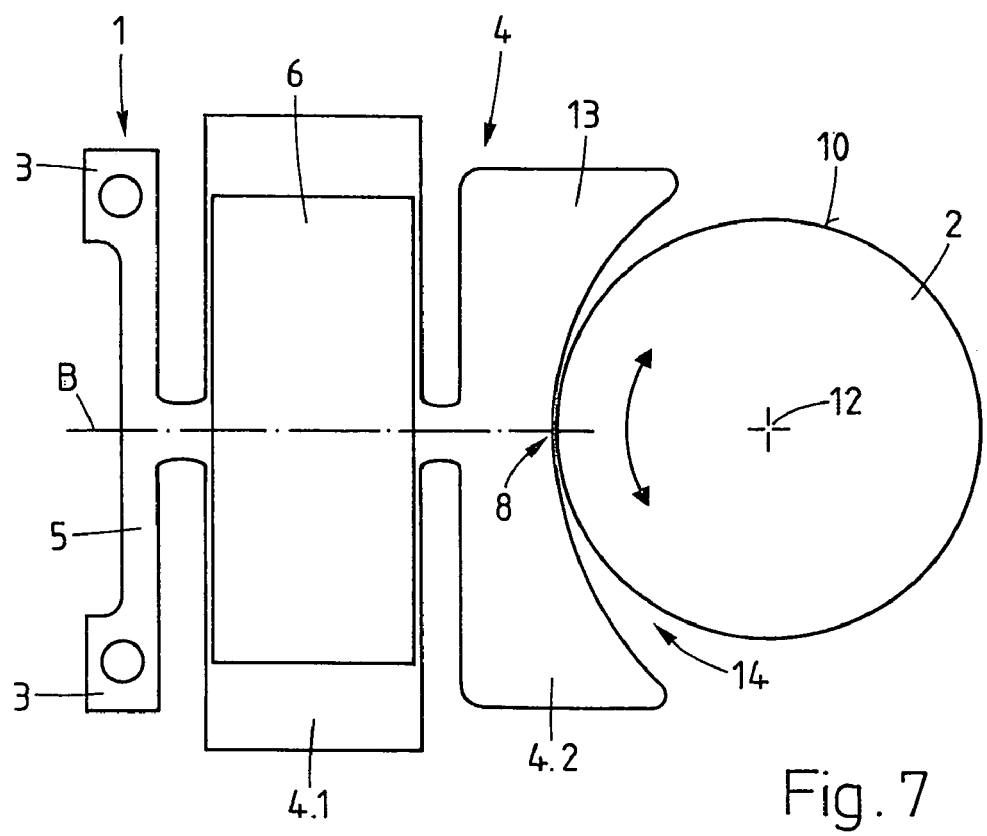
FIG. 7 illustrates a further embodiment form of a drive according to the invention with a resonator with a double horn.

FIG. 7 schematically and greatly simplified shows a further exemplary embodiment form of a piezoelectric drive according to the invention, which is designed as a drive for a rotor 2 rotatingly mounted about a rotational axis 12 (viewing angle perpendicular to the movement direction and perpendicular to the drive plate in the direction of the axis 12). The figure shows the drive plate, which represents a first drive body or is fastened on such, and a second body (rotor), which is to be driven by way the drive relative to the first body 1 in the one or other arrow direction. The drive plate 1 here comprises rest regions 3 and a resonator region 4, with the resonator region 4 forming a main resonator region 4.1 and a secondary resonator region 4.2 that are functionally connected to one another via a necking. The secondary resonator region 4.2 is designed as a double horn 13 asymmetrical to the transverse axis B. The contact edge region 8 lies in the trough 14 between the horns. A symmetrical design of the double horn 13 is possible with a corresponding, e.g. asymmetrical, arrangement of the body 2 to be driven.

Designs with several actively connected main and secondary resonator regions are possible.

The spring region 5 is designed as a narrow strip whose alignment has a component transverse to the transverse axis Q. It advantageously opens into the resonator region 4 at a location at which a wave node is located for frequencies at which the drive is to be operated.

FIG. 8 shows a motor that consists essentially of three drives according to FIG. 7. The drive plate 1 or the drive plates of these drives are arranged centrically in a plane about a body 2 to be driven, such that this does not compellingly require an external mounting. The three drive plates 1 shown may also be unified into a single drive plate with three resonator regions 4.

FIG. 9 shows schematically and greatly simplified, a drive with a simple, flat construction. The drive plate 1 or the drive plates each comprise two resonator regions 4 that are connected in each case via a spring region 5 to the rest region 3 and that are designed in the same manner as the resonator regions 4 represented in the FIGS. 7 and 8.

The drives shown in FIGS. 7, 8 and 9 may all be realized with one or several, advantageously congruently arranged drive plates 1, which means that when cross-sectioned they may have the shapes represented in FIGS. 2a to 2f.

It is of course possible to design the resonators of a piezoelectric drive according to the invention with features that are represented, not combined with one another, in separate figures.

Figure 10:
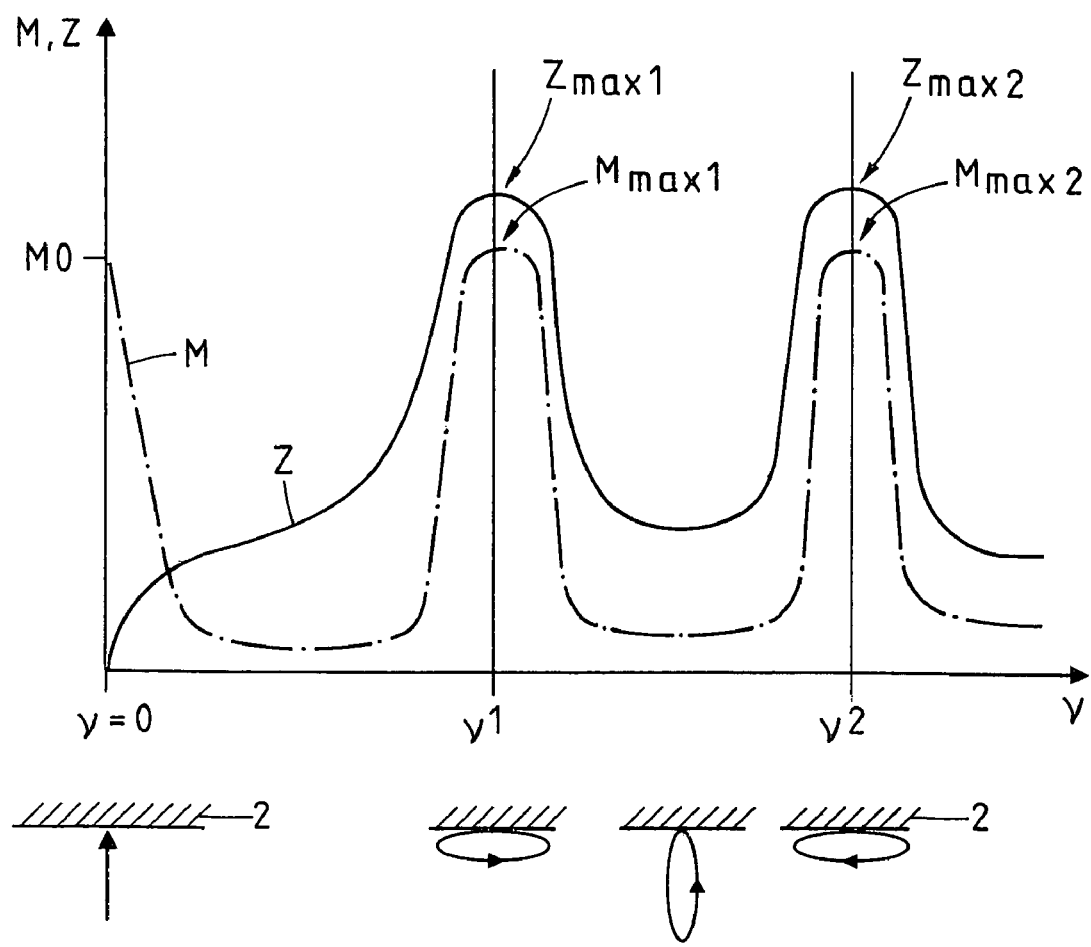

FIG. 10 very schematically shows an operating curve for the drive according to the invention. In this the torque M and the impedance Z are represented as a function of the drive frequency v. Such operating curves may for example be measured directly at the piezoelement via a voltage measurement (measuring connection insulated from the supply, at the side of the piezoelement lying at the supply voltage, see FIG. 2f). The measurements may serve for determining off-line, the frequency to be selected for a desired movement direction or for the on-line control of the supply frequency and/or supply voltage. Under the operating curve the oscillations of a contact edge region of a resonator, said region being in contact with a body 2, are indicated.

In the operating curve shown there are visible two distinguished frequencies $v^1$ and $v^2$ for which the elliptical oscillation aligned along the surface of the body to be driven with directions opposite to one another are determined. The two frequencies $v^1$ and $v^2$ are characterised by a maximal torque and maximal impedance. At a frequency v=0 (standstill) the contact edge region is pressed by way of the pretension of the spring region against the body to be driven (retaining moment M0). Between the two distinguished frequencies one ascertains an oscillation directed essentially transversely to the surface of the body 2 to be driven, which has no driving effect, but which however relevantly reduces the moment with respect to the retaining movement (freerun).

The invention claimed is:

1. A piezoelectric drive for producing a relative movement in a movement plane between a first body and a second body, said drive comprising at least one piezoelement which may be driven with a high-frequency alternating voltage, and a resonator (4) with a tapering horn (7), said resonator being mechanically coupled to the piezoelement and able to be excited by the piezoelement in a standing wave, wherein the resonator (4) is connected to the first body and a region (8) of the horn may be pressed against a surface (10) of the second body (2), wherein the drive comprises a drive plate (1) that forms the first body or is fastened on the first body and that is arranged parallel to the movement plane, wherein the drive plate (1) comprises a rest region (3) and at least one resonator region (4), wherein between the rest region (3) and the resonator region (4) there is arranged a spring region (5) that is resilient parallel to a plane of the drive plate (1), a flat piezoelement (6) is coupled laterally onto the at least one resonator region (4), and wherein the second body (2) may be positioned relative to the drive plate (1) such that the at least one resonator region (4), with a contact edge region (8) lying in the region of the horn by way of a pretension of the spring region (5), is pressed against a surface (10) of the second body (2), which is aligned essentially transverse to the plane of the drive plate (1) such that the second body may be driven (1) such that the second body may be driven essentially parallel to the surface (10).

2. The piezoelectric drive according to claim 1, wherein the at least one piezoelement (6) is flat and rectangular and may be excited in a 3,1 mode, the longitudinal axes (A) of the piezoelement (6) and the resonator region (4) are arranged lying over one another and the horn (7) extends in the longitudinal direction and the contact edge region (8) is aligned essentially parallel or tangentially to the movement direction.

3. The piezoelectric drive according to claim 2, wherein the horn (7) of the at least one resonator region (4) tapers asymmetrically to the longitudinal axis of the resonator region (4).

4. The piezoelectric drive according to claim 1, wherein the resonator region (4) comprises a main resonator region (4.1) and at least one secondary resonator region (4.2).

5. The piezoelectric drive according to claim 4, wherein the secondary resonator is shaped as a double horn (13) with a trough (14) and the contact edge region (8) is arranged in the trough (14).

6. The piezoelectric drive according to claim 1, wherein, on each side of the piezoelement (6) or the piezoelements (6), a resonator region (4) of a drive plate (1) is coupled.

7. The piezoelectric drive according to claim 6, wherein in the contact edge region (8) between the two resonator regions (4) arranged in each case on one side of the piezoelement (6) there is arranged a distance element (8').

8. The piezoelectric drive according to claim 1, wherein the movement to be produced is a rotational movement and the rest region (3) of the drive plate (1) is essentially annular.

9. The piezoelectric drive according to claim 8, wherein the drive plate (1) comprises a plurality of resonator regions (4) and wherein said plurality of resonator regions are at regular distances from one another and, on an inward or outward side, connect to the rest region (3).

10. The piezoelectric drive according to claim 1, wherein the spring region (5) is a narrow strip whose alignment has a component parallel to the longitudinal axes (A) and which opens into the resonator region (4) where a standing longitudinal wave has a wave node.

11. The piezoelectric drive according to claim 1, wherein the drive plate (1) consists of an electrically conducting material, a plurality of piezoelements (6) are stuck onto the resonator regions (4) with an electrically conducting adhesive, and the drive plate (1) in the rest region (3) is connected to the high-frequency alternating voltage or to ground.

* * * * *